United States Patent [19]
Weiland et al.

[11] 4,201,815
[45] May 6, 1980

[54] SHEAR TRANSFER ELEMENT

[75] Inventors: Emil Weiland, Hohenbrunn; Rudolf Schindler, Ottobrunn; Klaus Brunsch, Weidach, all of Fed. Rep. of Germany

[73] Assignee: Messerschmitt-Bölkow-Blohm GmbH, Munich, Fed. Rep. of Germany

[21] Appl. No.: 972,223

[22] Filed: Dec. 22, 1978

[30] Foreign Application Priority Data

Dec. 24, 1977 [DE] Fed. Rep. of Germany ....... 2757965

[51] Int. Cl.² .............................................. B32B 5/12
[52] U.S. Cl. .................................. 428/113; 428/105; 428/114; 428/225
[58] Field of Search ............... 428/105, 107, 112, 113, 428/114, 116, 225, 257

[56] References Cited

U.S. PATENT DOCUMENTS

| | | | |
|---|---|---|---|
| 3,072,513 | 1/1963 | Schlarb | 428/113 |
| 3,471,353 | 10/1969 | Roamuson | 428/105 |
| 3,977,614 | 8/1976 | Hardwick | 156/446 |
| 4,048,360 | 9/1977 | Jonds | 428/113 |
| 4,055,697 | 10/1977 | Schzanski | 428/113 |
| 4,137,353 | 1/1979 | Fariello | 428/257 |

Primary Examiner—James J. Bell
Attorney, Agent, or Firm—Toren, McGeady and Stanger

[57] ABSTRACT

Shear transfer elements can be formed by winding or weaving unidirectional fibers on a support structure. In a winding operation the support structure consists of two intersecting planes of winding mandrels with the planes arranged in angularly spaced relation. Each plane has two pair of mandrels with the mandrels in each pair located on the opposite sides of the line of intersection between the two planes. After the fibers are wound on the mandrels, each mandrel is axially disposed in the opposite direction relative to the other mandrel in the pair and also to the adjacent mandrel in the other pair in the same plane. Next, the fibers are pressed to form the shear transfer element. In a weaving operation, the support structure consists of a pair of pivotally interconnected frames. The fibers are woven onto holders on the sides of each frame extending parallel to the pivot axis of the frames. After placement of the fibers on the frames, the frames are pivoted apart and the fibers are pressed to form the shear transfer element.

7 Claims, 7 Drawing Figures

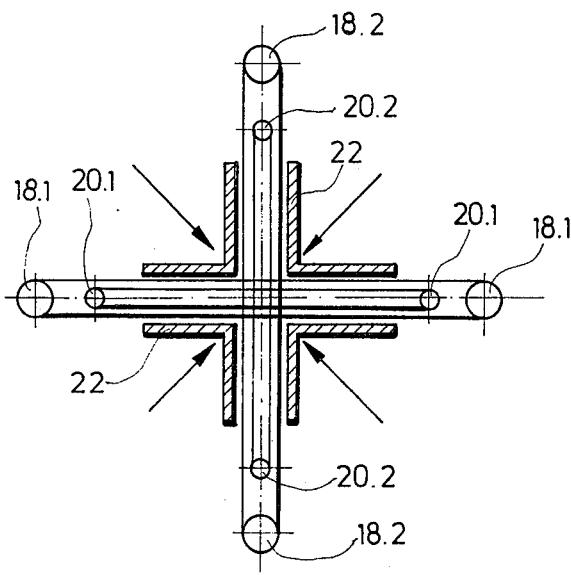
Fig. 5
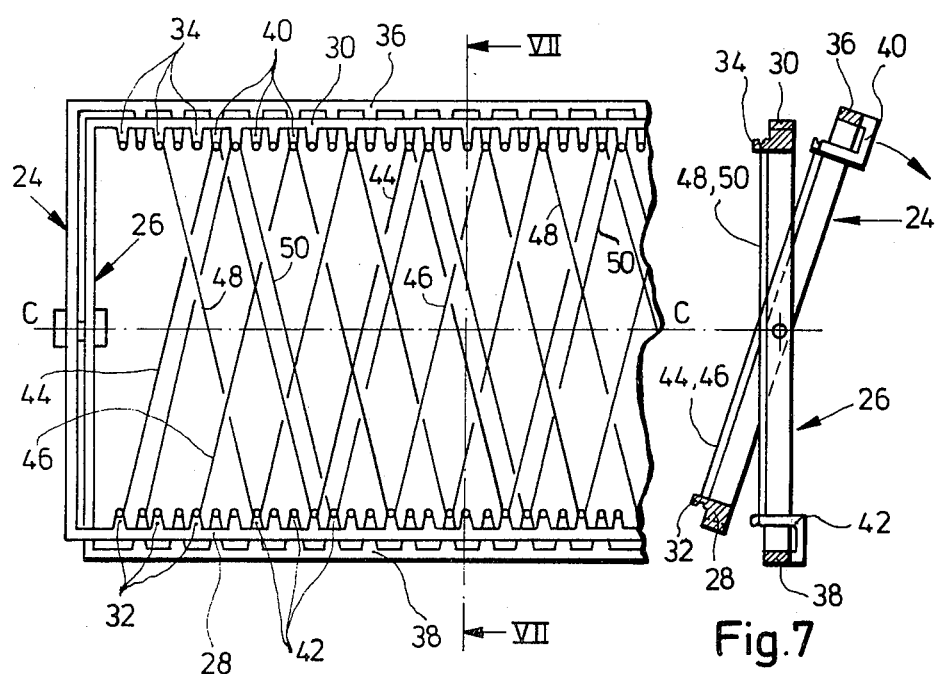
Fig.6
Fig.7

SHEAR TRANSFER ELEMENT

SUMMARY OF THE INVENTION

The invention is directed to a shear transfer element made up of planar shear-resistant webs interconnected along a common line of intersection. The webs are formed of crossing layers of fibers of a compound fiber material with the fibers extending obliquely to the direction of the line of intersection between the webs. Additionally, the invention is directed to the method of manufacturing such shear transfer elements.

In known shear transfer elements of this type formed with a T-shaped or cross-shaped cross-section, the webs must be glued together at the intersection line of the transfer element and, as a result, such transfer elements have a reduced strength in the region of the line of intersection between the webs, because the fibers in the webs are interrupted at the glued joint. The danger exists that the webs will separate at the line of intersection when increased shear loads or transverse forces are applied.

Therefore, it is the primary object of the present invention to provide a shear transfer element and a method of producing such a transfer element with a uniformly high shearing strength guaranteed over its entire cross-section including the line of intersection of the transfer element webs. When high transverse forces are applied to such a shear transfer element, separation of the webs along their intersection junction line is prevented. In accordance with the present invention, a shear transfer element is provided in which the individual fibers forming the webs cross each other at the intersecting junction line with the individual fibers extending continuously through the web on both sides of the intersecting line.

Due to the special manner in which the fibers of the shear-resistant webs of the transfer element cross one another and extend through the line of intersection, there is no adhesive material joints which transfer the shear loads across the line of intersection of the webs. On the contrary, the fibers reinforcing the webs extend continuously through the line of intersection so that superior strength and stiffness properties of compound fiber materials are provided over the entire cross-section of the transfer element. As a result of the special arrangement afforded by the present invention which is advantageous in regard to material and load, local weak points at the critical intersecting junction of the webs are eliminated. These weak points are common in conventional components of the type described above. Accordingly, the effective strength of the transfer elements is significantly increased and, in addition, high transverse forces which act in two different directions in respect to space can be transferred safely and without any local overloading.

To increase the shearing strength and stiffness of the transfer element, it is recommended that each planar web forming the element consist of a plurality of integrally connected fiber layers with the fibers in each layer being unidirectional and with the fibers in certain adjacent layers extending in different directions. In this case, taking into consideration the anisotropic material properties of compound fiber materials, the individual fibers in each layer extend through the intersecting junction line of the webs in a uniform parallel spacing arrangement. An especially shear-resistant arrangement is afforded when the fibers of adjacent fiber layers extend across each other at an angle of 90° and, further, are inclined relative to the intersecting junction line at angles of plus or minus 45°.

If additional bending, tension or compression loads become effective in different planes of the transfer element, for example, when loads are applied to the webs of a transfer element used as a rotor head in a helicopter without leg and flapping hinges, it is preferable if reinforced flange sections of compound fiber material with unidirectional fibers are secured to the free longitudinally extending edges of the webs.

Preferably, the multi-layered transfer elements are produced by a winding method or a weaving method.

In performing the winding method, winding mandrels are arranged in each of a plurality of intersecting planes with each plane containing an equal number of pairs of winding mandrels. The intersecting planes have an intersecting junction line with the mandrels of each pair in a plane being located on opposite sides of the intersecting junction line. The winding mandrels closer to the intersecting junction line have smaller diameters and the mandrels spaced further away from the junction line have larger diameters, that is, the diameters of the mandrels increase as the distance from the junction line increases. Initially, one or serveral loop-shaped windings of a fiber or filament of compound fiber material are wound about a pair of winding mandrels in one plane and, in turn, are then wound about each other pair of mandrels in the same plane. Subsequently, one or several loop-shaped windings are applied to the pairs of winding mandrels in the other planes with the winding operation being changed in a cyclic manner. The winding cycle is repeated until each pair of winding mandrels has the desired number of adjacently arranged windings. With the winding of the fibers or filaments completed, the mandrels in each pair of a plane are shifted parallel to the intersecting junction line in opposite directions and adjacent mandrels in different pairs in the same plane are also moved in opposite directions relative to one another. As a result, the windings on adjacent pairs of winding mandrels extend in an opposite inclined direction relative to the intersecting junction line of the planes or webs formed. Finally, the wound structure is pressed into a unitary structural component having a cross-sectional shape corresponding to the transfer element. Accordingly, it is possible to produce, continuously and with little time and operational requirements, intersecting fiber layers of different orientations in a spatial pattern which corresponds to the finished structural transfer element by utilizing a winding method which can be carried out mechanically, without difficulties, by means of a simple winding apparatus.

To prevent any displacement of the fibers from the desired orientation until the final compound fiber material is completed, advantageously the windings remain tensioned and fixed in the wound position around the mandrels during the pressing operation. If desired, after pressing and curing, the loop region of the fibers can be cut off. The winding filament may consist of glass or carbon fibers embedded in a thermosetting plastics material with the fiber being impregnated with the plastics material before and/or after winding and before the pressing step. In a particularly preferred manner, at least those pairs of winding mandrels located in the same plane are wound with a continuous filament so that only a single filament is used for each plane and is placed around each of the winding mandrels by an appropriate winding arm.

It is possible, however, to wind each pair of winding mandrels from a separate filament or fiber supply which operates intermittently during the winding cycle and is effective for applying one or several windings.

On the other hand, the entire wound structure can be manufactured from a single filament, however, in the case of a mechanized winding procedure, this requires, with an increasing number of pairs of winding mandrels, more complicated kinematics of the filament supply to the winding mandrels.

The various features of novelty which characterize the invention are pointed out with particularity in the claims annexed to and forming a part of this disclosure. For a better understanding of the invention, its operating advantages and specific objects attained by its use, reference should be had to the accompanying drawings and descriptive matter in which there are illustrated and described preferred embodiments of the invention.

BRIEF DESCRIPTION OF THE DRAWINGS

In the drawing:

FIG. 5 is an end view of the winding mandrel arrangement shown in FIG. 3 with the fibers wound onto the mandrels, and immediately before the pressing step;

FIG. 6 is a partial side view of weaving frames for manufacturing the transfer element illustrated in FIG. 1a by a weaving method; and FIG. 7 is a sectional view taken along the line VII—VII of FIG. 6, however, with one of the weaving frames partially angularly displaced relative to the other frame.

DETAIL DESCRIPTION OF THE INVENTION

Figure 1:
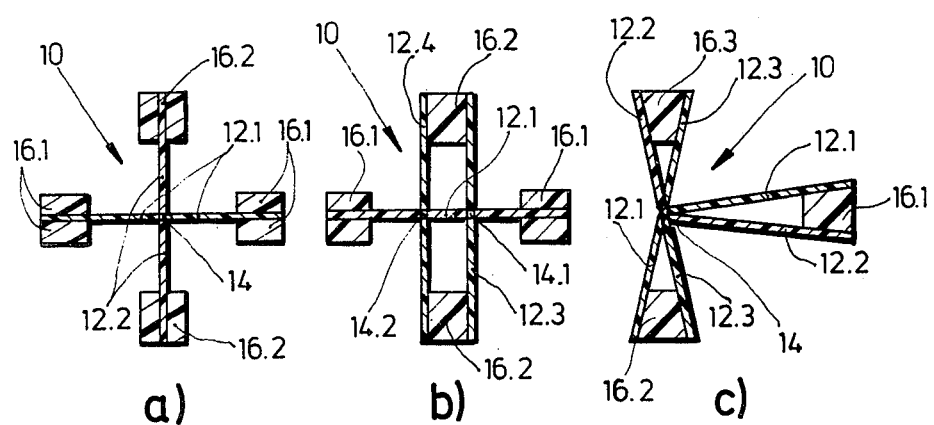
FIGS. 1a, 1b and 1c each show a different embodiment of a transfer element embodying the present invention, with each element having a different cross-sectional shape.

Each of FIGS. 1a, 1b and 1c shows a different embodiment of a transfer element 10. In FIG. 1a, the transfer element has a cross-shaped cross-section and consists of two planar, shear-resistant webs 12.1 and 12.2 with the webs intersecting one another over their entire lengths along an intersecting junction line 14. Each of the planar webs 12.1 and 12.2 is formed of a compound fiber material with the fibers inclined by plus or minus 45° relative to the intersecting junction line 14 of the transfer element 10. To ensure that the transfer element 10 can withstand bending, tension and compression loads, in addition to the transverse forces in the two planar webs 12.1 and 12.2, the free edges of the webs extending generally parallel with the intersecting junction line 14 are provided with reinforced flange sections 16.1, 16.2 of compound fiber material with the fibers extending unidirectionally in the longitudinal direction of the flanges on the transfer element.

In FIG. 1b, the transfer element 10 is of a similar design, however, in place of the planar web 12.2, two parallel spaced planar webs 12.3 and 12.4 are arranged intersecting the planar web 12.1 along a pair of intersecting junction lines 14.1 and 14.2. The web 12.1 has flanges 16.1, similar to those in FIG. 1a, however, the webs 12.3 and 12.4 have reinforcing flanges located between their edges spaced outwardly from the web 12.1. This embodiment increases the shearing strength of the transfer element in the plane of the planar webs 12.3 and 12.4 and, due to the box-type cross-sectional shape of these webs and their flanges, a certain torsional strength is afforded. In FIG. 1c, the transfer element 10 has a T-shaped cross-section consisting of webs 12.1, 12.2 and 12.3 formed of a compound fiber material with the layers of the fibers inclined relative to the intersecting junction line of the webs. The individual fibers in each planar web extend through the intersecting juncture line 14 of the webs. Flange sections 16.1, 16.2 and 16.3 each formed of compound fiber material with unidirectional fibers are secured between the adjacent webs at the edges of the webs spaced outwardly from the intersecting junction line 14.

Figure 2:
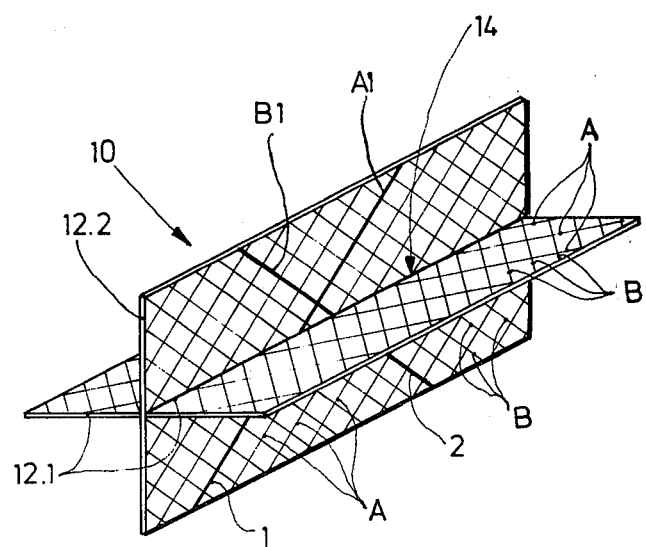
FIG. 2 is a schematic perspective view of a transfer element as shown in FIG. 1a illustrating the fiber orientation within the element.

To illustrate the arrangement fibers within the transfer element, FIG. 2 shows the element set forth in FIG. 1a, however, without the flanges. Each web 12.1, 12.2 consists of fiber layers A and B with the fibers within each layer extending unidirectionally and passing through the intersecting junction line 14. Furthermore, the fibers are integrally connected by means of a plastics material, such as an epoxy resin. The fibers in layer A are inclined in one direction relative to the intersecting junction line 14 while the fibers in the layer B are inclined in the opposite direction relative to the junction line, note the illustration of fiber A1 in fiber layer A and of fiber B1 in fiber layer B of the web 12.2. Since each fiber extends continuously through the intersecting junction line 14, a high shearing strength and stiffness of the transfer element is ensured where the planes of the webs 12.1 and 12.2 cross. In other words, as viewed in FIG. 2, each of the webs 12.1 and 12.2 has a web part on an opposite side of the intersecting junction line 14. The fibers extend continuously from one part of the web to the other passing through the intersecting junction line in crossing relationship with the fibers in the adjacent layer.

Figure 3:
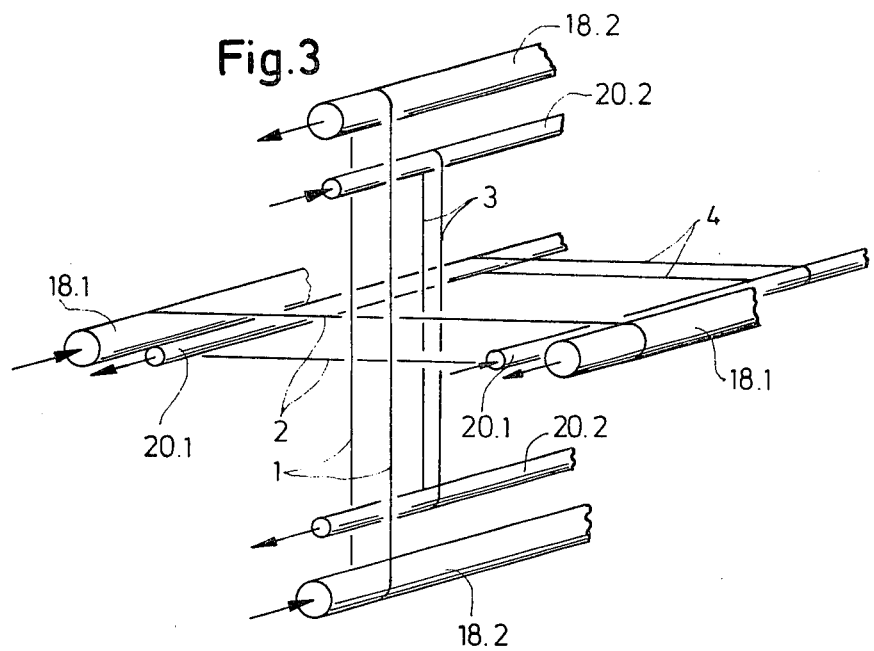
FIG. 3 is a schematic perspective view of an arrangement of winding mandrels employed in the winding method embodying the present invention.
Figure 4:
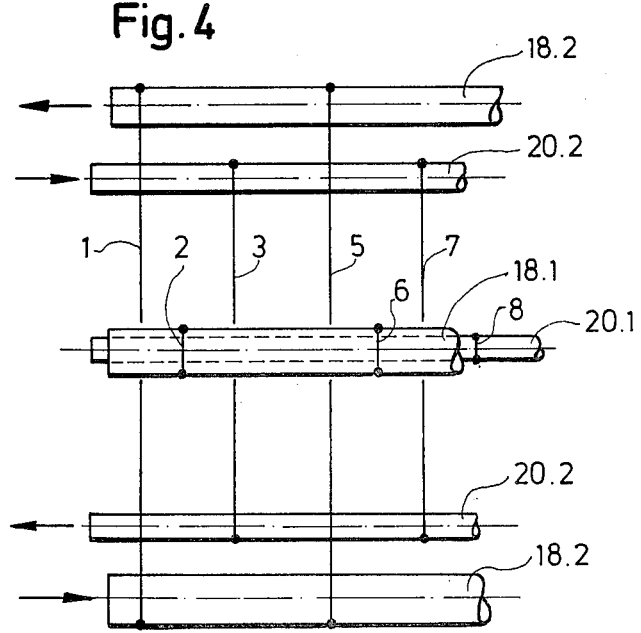
FIG. 4 is a side view of the winding mandrels shown in FIG. 3.

The spatial arrangement of the fibers of the transfer element can be obtained by a winding method or a weaving method. The winding method for producing a transfer element 10 according to FIGS. 1a and 2 is shown in FIGS. 3–5. The winding method is carried out by an arrangement of winding mandrels disposed in angularly spaced planes for forming the webs 12.1 and 12.2. As viewed in FIG. 3, the horizontal plane of winding mandrels consists of an outer pair of mandrels 18.1 and an inner pair of mandrels 20.1 with the axes of the mandrels disposed in parallel relation to the intersecting junction line of the planes. Similarly, the vertical plane consists of an outer pair of mandrels 18.2 and an inner pair of mandrels 20.2. In each of the planes of mandrels, the pair of mandrels 18.1 or 18.2 spaced further from the intersecting junction line of the planes has a larger diameter than the pair of inner winding mandrels 20.1 and 20.2. During the winding operation, first one or at most several windings of a reinforcing filament consisting of reinforcing fibers which may be already impregnated with plastics material, is wound in the form of a loop about the pair of mandrels 18.2 in the vertical plane, note filament winding 1 in FIGS. 3 and 4. Next, one or several successive windings 2 are placed about the mandrels 18.1 in the horizontal plane. The plane of winding is switched again to the vertical plane and winding 3 is placed around the pair of mandrels 20.2. Finally, one or several windings 4 are placed about the mandrels 20.1 in the horizontal plane. This winding cycle is continued with the filaments or fibers 5, 6, 7 and 8 as shown in FIG. 4 until each pair of mandrels supports the desired number of would filaments or fibers. While for clarity's sake the individual wound filaments 1, 2, 3 . . . are shown spaced apart in practice the filaments follow one another close together and do not form closed loops on each pair of winding mandrels, but continuous radial windings 1, 5 . . . or 2, 6 . . ., etc. which are placed about each respective pair of mandrels while the entire arrangement of the winding mandrels is moved axially. It is also possible to wind the filaments in each plane of the mandrels with a single continuous filament, that is, winding the filaments 1, 3, 5 . . . in the vertical plane and the filaments 2, 4, 6 . . . in the horizontal plane as a single filament in each of the planes. In such an arrangement, however, the control of the filament between individual pairs of mandrels must be adjusted in accordance with the above described winding cycle.

In this manner, the crossing planes of the winding mandrels with the outer and inner loop-shaped windings are formed in close sequence. The windings in each plane cross the windings in the other plane and, at first, aside from a slight pitch of the windings, each winding extends essentially perpendicularly relative to the intersecting junction line of the planes of the mandrels, note FIGS. 3 and 4. With the winding operation completed, the mandrels of each pair are shifted in the axial direction with each mandrel being displaced in the opposite direction relative to the other one of the pair and also moved in the opposite direction relative to the adjacent mandrel of the other pair within the same plane, note the arrows in FIGS. 3 and 4. In other words, in the horizontal plane, the left-hand mandrel 20.1 is moved toward the left while the right-hand mandrel 20.1 is moved to the right and, at the same time, the adjacent left-hand mandrel 18.1 is moved to the right while the adjacent right-hand mandrel 18.1 is moved to the left. By virtue of this displacement of the mandrels with the filaments wound on them, the spacing of the mandrels within each pair is slightly reduced until the windings extend at the desired angle of inclination relative to the intersecting junction line of the planes, such as at an angle of 45° as shown in FIG. 2. Because of the manner in which the mandrels are displaced, the fiber layers on one side of the mandrels extend in opposite directions, that is, they are inclined one relative to the other. If necessary, the wound structure is subsequently impregnated with plastics material and, according to FIG. 5, is pressed in a multi-part molding tool 22 with the parts of the tool being pressed inwardly toward one another in the direction of the arrows shown in FIG. 5. This pressing action provides a structural component having a cross-sectional shape of the finished transfer element and the pressed member is cured by means of heat. Subsequently, the winding mandrels are removed from the loop regions and the loop portions are cut off. If desired, the mandrels can be removed prior to the pressing step and the loop portions can be pressed and cured so that they remain a part of the finished transfer element 10.

Transfer elements 10 can also be produced in a weaving process utilizing the rectangularly shaped weaving frames 24, 26 illustrated in FIGS. 6, 7. The frames are interconnected on a pivot axis C and can be angularly displaced relative to one another about this axis, note the direction in which frame 24 is moved about the axis C relative to frame 26 in FIG. 7. To permit the angular displacement between the weaving frames 24, 26 they are arranged in a staggered manner, that is, the sides of one frame are offset laterally relative to the corresponding sides of the other frame. For example, the longitudinal side 28 of frame 24 and longitudinal side 30 of frame 26 are located closer to the axis C and each of these longitudinal sides has uniformly spaced filament holders 32, 34, respectively. In the same general manner, each of the frames has its other longitudinal side spaced further away from the axis C on the opposite side of the axis. Note longitudinal side 36 of frame 24 is located further from the axis C than the adjacent longitudinal side 30 of frame 26. Similarly, on the opposite side of the axis C the longitudinal side 38 of the frame 26 is located further away from the axis C than the adjacent longitudinal side 28 of the frame 24. Each of the outer longitudinal sides 36, 38 has stirrup-shaped filament holders 40, 42, respectively, which in the closed or weaving position of the frames are interleaved with the filament holders 32, 34. In other words, the filament holders 40, 42 extend under the adjacent inner longitudinal side 28, 30 of the other frame. Accordingly, along each of the opposite longitudinal sides of the two frames in the weaving position as shown in FIG. 6, on one side the filament holders 32 alternate with the filament holders 42 and on the other side the filament holders 34 alternate with the filament holders 40. The reinforcing fiber or filament is placed on each weaving frame 24, 26 in close sequence. The filament extends in a zigzag fashion between the holders 32 and 40 or between the holders 34, 42. Further, due to the zigzag arrangement the filaments extend obliquely relative to the axis C in accordance with the desired fiber angle relative to the intersecting junction line of the planes of the fibers in the finished transfer element 10. In FIG. 6, the weaving frames are shown partly woven with reinforcing filaments 44, 46 on weaving frame 24 and reinforcing filaments 48, 50 on weaving frame 26. As can be seen in this illustrated weaving process, the reinforcing filaments 44, 46 between the holders 32 and the axis C extend over the reinforcing elements 48, 50 and that between the axis C and the holders 40, the filaments 44, 46 extend below the filaments 48, 50 stretched on the frame 26. In this manner, each weaving frame has a close crossing filament netting with the two filament nettings or fiber layers crossing one another along the axis C which is comparable to the intersecting junction line of the webs of the transfer element. In the weaving position, the weaving frames 24, 26 are located in closely spaced relation with their filament holders interleaved. When the weaving operation is completed, the weaving frame 24 is pivoted about the axis C relative to the weaving frame 26 in the direction of the arrow shown in FIG. 7, until the planes of the fiber layers on each of the weaving frames are disposed angularly relative to one another in crossing or intersecting planes. The reinforcing filaments 44–50 are impregnated with plastics material either before the weaving operation or after the fiber layers have been woven on the weaving frames. To obtain the finished transfer element, the fiber layers are pressed in the manner disclosed with regard to FIG. 5 and the element is cured. In this arrangement, it is possible to cut off the portions of the fiber layers extending around the hooks or filament holders after the transfer element is completed.

While specific embodiments of the invention have been shown and described in detail to illustrate the application of the inventive principles, it will be understood that the invention may be embodied otherwise without departing from such principles.

What is claimed is:

1. Shear transfer element comprising at least two intersecting shear resistant planar webs each arranged in a plane spaced angularly relative to the other and said webs joined to one another along an intersecting junction line extending across each of said webs, each said web comprising a compound fiber material with the fibers arranged in a crossing arrangement and with the fibers obliquely inclined to the intersecting junction line, wherein the improvement comprises that each of said webs extends laterally outwardly from opposite sides of the intersection junction line having a first part on one side of the intersecting junction line and a second part on the opposite side thereof, and said fibers in each said web extend continuously through the intersecting junction line from said first part to said second part thereof.

2. Shear transfer element, as set forth in claim 1, wherein each said web has a plurality of integrally connected fiber layers with the fibers in each layer being unidirectional and extending angularly relative to the fibers in at least one adjacent fiber layer.

3. Shear transfer element, as set forth in claim 2, wherein said fibers in each said fiber layer extend across the intersecting junction line and are arranged in parallel and are uniformly spaced.

4. Shear transfer element, as set forth in claim 3, wherein said fibers in one said layer extend angularly to the fibers in an adjacent said layer at an angle of substantially 90° and are inclined relative to the intersecting junction line at an angle of 45°.

5. Shear transfer element, as set forth in claim 2, wherein said webs each have first edges spaced outwardly from and extending in the direction of the intersecting junction line, flanges secured to and extending along the first edges of said webs, said flanges being formed of a compound fiber material with the fibers being unidirectional and extending in the direction of said first edges.

6. Shear transfer element, as set forth in claim 4, wherein said fibers in said webs are disposed in a woven arrangement.

7. Shear transfer element, as set forth in claim 4, wherein said fibers in said webs are disposed in a wound arrangement.

* * * * *